United States Patent
Yoon et al.

(10) Patent No.: US 10,629,373 B2
(45) Date of Patent: Apr. 21, 2020

(54) THIN FILM CAPACITOR

(71) Applicant: SAMSUNG ELECTRO-MECHANICS CO., LTD., Suwon-si, Gyeonggi-do (KR)

(72) Inventors: Hee Soo Yoon, Suwon-si (KR); Su Bong Jang, Suwon-si (KR); Sang Jong Lee, Suwon-si (KR); Seung Hee Hong, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/675,446

(22) Filed: Aug. 11, 2017

(65) Prior Publication Data

US 2018/0174750 A1    Jun. 21, 2018

(30) Foreign Application Priority Data

Dec. 15, 2016 (KR) .................. 10-2016-0171750

(51) Int. Cl.
*H01G 4/06* (2006.01)
*H01G 4/248* (2006.01)
(Continued)

(52) U.S. Cl.
CPC ............ *H01G 4/06* (2013.01); *H01G 4/0085* (2013.01); *H01G 4/012* (2013.01); *H01G 4/224* (2013.01); *H01G 4/232* (2013.01); *H01G 4/2325* (2013.01); *H01G 4/248* (2013.01); *H01G 4/30* (2013.01); *H01G 4/33* (2013.01); *H01G 4/1227* (2013.01); *H01G 4/1245* (2013.01)

(58) Field of Classification Search
CPC .......... H01G 4/012; H01G 4/30; H01G 4/008; H01G 4/12; H01G 4/005; H01G 4/248; H01G 4/33; H01G 4/232; H01G 4/1227; H01G 4/1245
See application file for complete search history.

(56) References Cited

U.S. PATENT DOCUMENTS

| 7,196,898 B2 * | 3/2007 | Osaka .................. H01G 4/1227 361/301.1 |
| 2004/0130849 A1 * | 7/2004 | Kurihara ................ H01G 4/228 361/311 |

(Continued)

FOREIGN PATENT DOCUMENTS

| JP | 2013-229582 A | 11/2013 |
| JP | 2014-090077 A | 5/2014 |
| KR | 10-2012-0077318 A | 7/2012 |

*Primary Examiner* — Nguyen T Ha
(74) *Attorney, Agent, or Firm* — Morgan, Lewis & Bockius LLP

(57) ABSTRACT

A thin film capacitor includes a body including a dielectric layer, a first internal electrode layer and a second internal electrode layer, a melting point of a material included in the first internal electrode layer being lower than a melting point of a material included in the second internal electrode layer, and a first external electrode and a second external electrode disposed on an upper surface of the body, the second internal electrode layer being disposed on an upper surface of the first internal electrode layer and a lower surface of the first internal electrode layer opposing the upper surface of the first internal electrode layer.

22 Claims, 1 Drawing Sheet

(51) Int. Cl.
  *H01G 4/33*   (2006.01)
  *H01G 4/232*  (2006.01)
  *H01G 4/012*  (2006.01)
  *H01G 4/008*  (2006.01)
  *H01G 4/30*   (2006.01)
  *H01G 4/224*  (2006.01)
  *H01G 4/12*   (2006.01)

(56) References Cited

U.S. PATENT DOCUMENTS

| | | | | |
|---|---|---|---|---|
| 2006/0126267 | A1* | 6/2006 | Sakashita | H01G 4/10 361/306.3 |
| 2006/0214205 | A1* | 9/2006 | Baniecki | H01G 4/005 257/295 |
| 2007/0141800 | A1* | 6/2007 | Kurihara | H01G 4/33 438/396 |
| 2010/0246089 | A1* | 9/2010 | Yano | H01G 4/228 361/306.1 |
| 2012/0169447 | A1 | 7/2012 | Yang et al. | |
| 2013/0038981 | A1* | 2/2013 | Imanaka | H01G 4/1227 361/301.4 |
| 2013/0094120 | A1* | 4/2013 | Sasajima | H01L 27/016 361/305 |
| 2013/0258545 | A1* | 10/2013 | Yano | H01G 4/306 361/301.4 |
| 2015/0103465 | A1* | 4/2015 | Kang | H01G 4/1227 361/301.4 |
| 2015/0380167 | A1* | 12/2015 | Lim | H01G 4/30 361/301.4 |
| 2016/0027587 | A1* | 1/2016 | Furukawa | H01G 4/10 361/301.4 |
| 2016/0163463 | A1* | 6/2016 | Namikawa | H01G 4/33 361/301.3 |

\* cited by examiner

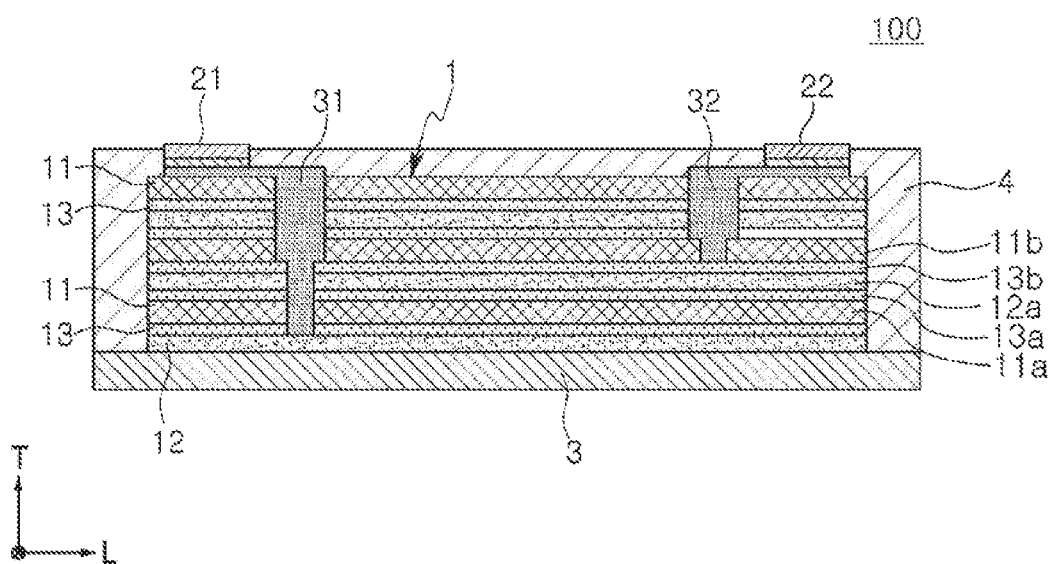

THIN FILM CAPACITOR

CROSS-REFERENCE TO RELATED APPLICATION(S)

This application claims the benefit of priority to Korean Patent Application No. 10-2016-0171750 filed on Dec. 15, 2016 with the Korean Intellectual Property Office, the disclosure of which is incorporated herein by reference in its entirety.

TECHNICAL FIELD

The present disclosure relates to a thin film capacitor and, more particularly, to a thin film capacitor adapted to realize high capacitance.

BACKGROUND

Recently, as electronic devices have increasingly been reduced in weight, integrated and reduced in thickness, passive devices applied to electronic devices have been required to become thinner as well. In particular, among passive devices, capacitors are required to be provided in larger numbers in circuits, and, due to the development of microelectronics, demand for coupling capacitors having high capacitance and a short connection length is increasing. A capacitor is an essential element in decoupling, filtering, tuning, or in general charge accumulation functions required for a circuit. In consideration of electronic devices which tend to be reduced in weight, thickness, length and overall size, capacitors may occupy a relatively large area, leading to an issue of increasing capacitance within a given space and demand for a material having a high dielectric constant has grown.

Japanese Patent Laid-open Publication No. 2013-229582 discloses a thin film condenser in which an average particle diameter of a crystal grain of an internal electrode layer and an average particle diameter of a crystal grain of a connection electrode are controlled to enhance stability of electrical connections between the internal electrode layer and the connection electrode. However, the reference does not provide a thin film capacitor having a high dielectric constant through the use of of a conductive material.

SUMMARY

An aspect of the present disclosure may provide a thin film capacitor having increased capacitance by selectively using a material with a high dielectric constant to increase a dielectric constant of a dielectric layer, while preventing a technical problem that may arise when a material with a high dielectric constant is selected.

According to an aspect of the present disclosure, a thin film capacitor may include: a body including a plurality of dielectric layers, a first internal electrode layer, and a second internal electrode layer; and a first external electrode and a second external electrode disposed on an upper surface of the body, wherein the second internal electrode layer is disposed on an upper surface of the first internal electrode layer and a lower surface of the first internal electrode layer opposing the upper surface of the first internal electrode layer, and a melting point of a material included in the first internal electrode layer is lower than a melting point of a material included in the second internal electrode layer.

BRIEF DESCRIPTION OF DRAWINGS

The above and other aspects, features, and advantages of the present disclosure will be more clearly understood from the following detailed description taken in conjunction with the accompanying drawings, in which:

FIG. 1 is a cross-sectional view of a thin film capacitor according to exemplary embodiments of the present disclosure.

DETAILED DESCRIPTION

Exemplary embodiments in the present disclosure will now be described in detail with reference to the accompanying drawings.

Hereinafter, a thin film capacitor according to exemplary embodiments of the present disclosure will be described, but the present disclosure is not limited thereto.

FIG. 1 is a cross-sectional view of a thin film capacitor according to exemplary embodiments of the present disclosure.

Referring to FIG. 1, some embodiments of a thin film capacitor 100 include a body 1 having a multilayer structure including a dielectric layer 11, a first internal electrode layer 12, and a second internal electrode layer 13, a first external electrode 21 and a second external electrode 22 disposed on an upper surface of the body 1.

Throughout the specification, a surface on which the first and second external electrodes 21 and 22 are disposed will be referred to as an upper surface and a surface opposing the upper surface will be referred to as a lower surface.

The body 1 includes an upper surface and a lower surface opposing each other in a thickness T direction, a first side surface and a second side surface opposing each other in a length L direction, and a first end surface and a second end surface opposing each other in a width W direction, having a substantially hexahedral shape. However, a shape of the body 1 is not limited thereto.

The lower surface of the body 1 is in contact with the protective layer 3. The protective layer 3 may have insulating properties and include a silicon (Si) wafer and an $SiO_2$ layer formed on the silicon wafer.

The first internal electrode layer 12, the second internal electrode layer 13, and the dielectric layer 11 are, in some embodiments, sequentially stacked on an upper surface of the $SiO_2$ layer of the protective layer 3.

The dielectric layer 11 may be formed of a material having dielectric properties. For example, $BaTiO_3$, barium strontium titanate (BST), a Pb (Zr, Ti)$O_3$ [PZT] group, a PNZT group, and/or a $SiO_2$ group may be selected. A thickness of the dielectric layer 11 may be appropriately selected by one skilled in the art as necessary, and may have a sub-micro scale equal to or less than about 1 μm. For example, a thickness of the dielectric layer 11 may range from 10 nm to 300 nm, inclusive. Here, the number of dielectric layers may be appropriately selected by one skilled in the art as necessary, and the dielectric layer 11 may be a single layer or a plurality of layers. When the dielectric layer is provided in plural, layers equal to or greater than 200 layers may be realized, or used or included.

An arrangement and a material of the first internal electrode layer 12 and the second internal electrode layer 13 will be described in detail.

In general, an internal electrode layer may be formed of a conductive material, and thus, copper (Cu), aluminum (Al), gold (Au), silver (Ag), platinum (Pt), iridium (Ir), and the like, may be used as a material of the first and second internal electrode layers 12 and 13.

Here, generally, a material with high conductivity tends to have a low melting point. Thus, when a material having high conductivity is used to form an internal electrode layer, high temperature heat is entailed, or used or included, during a process of forming a dielectric layer as a high-k thin film on the internal electrode layer to cause the material of the internal electrode layer having a low melting point in contact with the dielectric layer to be spread to the dielectric layer, degrade breakdown voltage characteristics of a capacitor due to a reaction between the dielectric layer and the internal electrode layer, and increase a leakage current in the capacitor. However, when a material having a high melting point is applied to the internal electrode layer, material costs may be increased and conductivity may be lowered to degrade ESR characteristics.

In order to solve, or address, these problems, the present application discloses a structure in which a first internal electrode layer is formed of a material having high conductivity and a low melting point, a second internal electrode layer is formed of a material having low conductivity and a high melting point, relative to the first internal electrode layer, and upper and lower surfaces of the first internal electrode layer are coated with the second internal electrode layer such that the upper and lower surfaces of the first internal electrode layer may be protected by the second internal electrode layer.

Here, when the first internal electrode layer is disposed immediately on, or adjacent, the protective layer, a separate coating structure is not required for the lower surface of the first internal electrode layer.

As illustrated in FIG. 1, the upper and lower surfaces of the first internal electrode layer 12 with high conductivity and a low melting point may not be in direct contact with the dielectric layer 11. This is to prevent a material of the first internal electrode layer with a low melting point from being spread to the dielectric layer at a high temperature or reacting with the dielectric layer 11 due to a high temperature when the dielectric layer is formed as described above.

Since both the upper and lower surfaces of the first internal electrode layer 12 with high conductivity and a low melting point are coated with the second internal electrode layer 13 with relatively low conductivity and a high melting point, although a high temperature is applied to the first internal electrode layer 12, a material of the first internal electrode layer 12 may be completely prevented from being spread to the dielectric layer 11. Thus, Breakdown Voltage (BDV) characteristics may not be degraded.

The structure of the first and second internal electrode layers 12 and 13 is particularly advantageous for providing a thin film capacitor realized with high capacitance because the high-k dielectric layer 11 is required to be treated at a high temperature to realize high capacitance. Although a high temperature heat treatment is applied, the structure of the first and second internal electrode layers 12 and 13 prevents spreading between the internal electrode layer 12 and the dielectric layer 11, significantly reducing ESR of the thin film capacitor.

Table 1 below shows a comparison between characteristic values of Comparative Example 1 in which both first and second internal electrode layers are formed of gold (Au) and Present Example 1 in which a first internal electrode layer is formed of gold (Au) and a second internal electrode layer is formed of iridium (Ir). Here, Comparative Example 1 and Present Example 1 are different in terms of an arrangement of the first internal electrode layer and the second internal electrode layer, in that the second internal electrode layer is formed of a material different from that of the first internal electrode layer and the first electrode layer and the second electrode layer are the same in terms of other requirements. For reference, Comparative Example 1 has a related art structure in which a unit of first internal electrode layer-dielectric layer-second internal electrode layer-dielectric layer is repeatedly stacked on an upper surface of a protective layer.

TABLE 1

| Sample | Type of electrode layer | Cap@30 kHz | ESR | $\Delta_{Cap}$ | $\Delta_{ESR}$ |
|---|---|---|---|---|---|
| Comparative Example 1 | Single electrode layer | 23.66 [nF] | 0.0765 [Ω] | 0.00% | 0.00% |
| Present Example 1 | Heterogeneous electrode layers | 23.65 [nF] | 0.0510 [Ω] | −0.06% | −33.33% |

Referring to Table 1, capacitances of Present Example 1 and Comparative Example 1 are substantially similar, but ESR characteristics of Present Example 1 were significantly improved to realize a thin film capacitor having ESR characteristics reduced by about one-third.

The results of Table 1 show that ESR of the thin film capacitor of this disclosure was reduced due to the use of a high melting point electrode material. Also, when the high melting point electrode material is used in a thin film capacitor, dielectrics including a dielectric material having high dielectric constant characteristics may be sufficiently manufactured, whereby a thin film capacitor with high capacitance, relative to a thin film capacitor using a related art low-k dielectrics, may be provided.

In detail, a material having high conductivity, relative to the second internal electrode layer 13, may be used as a material of the first internal electrode layer 12, and here, preferably, the material includes gold (Au), for example. Gold (Au) has high conductivity of about 4.6E+07 siemens/m and has a low melting point of about 1064° C. With these characteristics, gold (Au) is frequently used as a material of an internal electrode layer of a thin film capacitor. However, if the second internal electrode layer formed of gold (Au) is not coated and in contact with a dielectric layer, there is a limitation in temperature applied to the dielectric layer due to the low melting point of gold. Here, in the thin film capacitor of this disclosure, since the first internal electrode layer 12 is formed of gold and coated with the second internal electrode layer 13, a high temperature dielectric layer may be formed to realize a high dielectric constant.

The second internal electrode layer 13 may be formed of a material with a high melting point, relative to the first internal electrode layer 12. Preferably, the second internal electrode layer 13 includes platinum (Pt) or iridium (Ir). For example, iridium (Ir) has low conductivity of about 1.9E+07 siemens/m but has a high melting point of about 2447° C. Also, iridium is low in price and is thus economical, relative to gold. When the second internal electrode layer 13 is formed on the upper and lower surfaces of the first internal electrode layer 12, although a high temperature is applied due to high melting point characteristics of the second internal electrode layer 13, a spreading of a material between the first internal electrode layer 12 and the dielectric layer 11 may be prevented.

Thicknesses of the first and second internal electrode layers 12 and 13 may be appropriately selected by a person skilled in the art as necessary. For example, the first and second internal electrode layers 12 and 13 and the dielectric layer 11 may be formed in a thickness ratio of about 1:1. In some embodiments, the first and second internal electrode layers 12 and 13 may have a thickness of a submicron scale of about 1 μm or less, or of 1 μm or less.

Referring to FIG. 1, three internal electrode layers 12a 13a 13b are disposed between a certain dielectric layer 11a and a dielectric layer 11b disposed thereabove. Specifically, one first internal electrode layer 12a with a low melting point and two second internal electrode layers 13a 13b coating upper and lower surfaces of the first internal electrode layer 12a are disposed between the dielectric layers 11a 11b.

Although not shown, more than three internal electrode layers may be disposed between two adjacent dielectric layers disposed to be spaced apart from each other. Here, however, since the number of dielectric layers included within the same thin film capacitor is relatively reduced, disadvantageous for realizing capacitance, and thus, the number of respective layers may be determined by one skilled in the art in consideration of a material design and process conditions.

The first internal electrode layer 12 is connected to the external electrode 21 by a first via 31, and the second internal electrode layer 13 is connected to the second eternal electrode 22 by a second via 32. Side surfaces of the first and second vias are covered by an insulating layer, and here, the insulating layer may be disposed in consideration of open/short that internal electrode layers having opposite polarities are connected. As illustrated in FIG. 1, the first and second vias 31 and 32 may penetrate through the first and second internal electrode layers 12 and 13 and the dielectric layer 11 linearly, but the present disclosure is not limited thereto and the first and second vias 31 and 32 may be dry-etched to be sloped and there is no specific limitation in terms of a shape of the vias 31 and 32.

The first and second external electrodes 21 and 22 include first and second connection electrodes and first and second electrode pads disposed thereon, respectively.

In order to form the first and second external electrodes, a process of seed metal-passivation layer-seed etching-wiring formation-pad surface finishing is executed. Here, a seed is formed as a seed layer of Ti/W, Ti/Cu, and Ti/Al. The seed serves as the first and second connection electrodes. Thereafter, the first and second electrode pads include a gold (Au), copper (Cu), electroless nickel immersion gold (ENIG) layer completely treated through e-beam, sputtering, or a plating method. A passivation layer 4 is formed of a polymer on regions other than exposed regions of the first and second electrode pads. The passivation layer 4 is disposed to encapsulate side surfaces and an upper surface of the body 1 such that the body 1, excluding the regions of the upper surface exposing the first and second electrode pads, is embedded. The passivation layer 4 is formed to prevent degradation or contamination of a material of the body 1, the vias, the connection electrodes, and the like, embedded therein due to a chemical reaction with humidity and oxygen from the outside, and damage when mounted or during mounting. The passivation layer 4 may include a material with high heat resistance. For example, the passivation layer 4 may be formed of an organic thermosetting material such as polyimide or a photocuring material.

Subsequently, in order to generally form a thin film capacitor as an individual chip, wafer back grinding, dicing, cleaning, and tape & reel packing are sequentially performed to complete a thin film capacitor.

The aforementioned thin film capacitor is advantageous for realizing a capacitor of high capacitance. In general, in cases where a high-k dielectric material is introduced to a dielectric layer for a capacitor of high capacitance, spreading or a chemical reaction occurs between a dielectric layer and an internal electrode layer due to a high operation temperature to degrade BVD characteristics, or the like. In contrast, in the thin film capacitor according to exemplary embodiments of the present disclosure, since the first internal electrode layer with high conductivity and low melting point characteristics is coated with the second internal electrode layer having high melting point characteristics, relative to the first internal electrode layer, ESR may be improved, a degradation of BVD characteristics may be prevented, and high capacitance characteristics may be obtained.

As set forth above, according to exemplary embodiments of the present disclosure, the thin film capacitor with improved capacitance and ESR characteristics may be provided.

While exemplary embodiments have been shown and described above, it will be apparent to those skilled in the art that modifications and variations could be made without departing from the scope of the present disclosure as defined by the appended claims.

What is claimed is:

1. A thin film capacitor, comprising:
    a body including dielectric layers, a first internal electrode layer having surfaces facing the dielectric layers, and second internal electrode layers disposed on all surfaces of the first internal electrode layer facing the dielectric layers, a melting point of a material included in the first internal electrode layer being lower than a melting point of a material included in the second internal electrode layers; and
    a first external electrode and a second external electrode disposed on an upper surface of the body.

2. The thin film capacitor of claim 1, wherein the body has a multilayer structure including the dielectric layers and internal electrodes disposed above and below the dielectric layers, wherein an internal electrode disposed above one dielectric layer includes the first and second internal electrode layers, and an internal electrode disposed below the one dielectric layer includes a first internal electrode layer having a second internal electrode layer disposed in contact with only an upper surface thereof from among upper and lower surfaces thereof.

3. The thin film capacitor of claim 2, further comprising a protective layer in contact with a lower surface of the body, wherein the protective layer is in contact with the lower surface of the first internal electrode layer disposed below the dielectric layer.

4. The thin film capacitor of claim 1, further comprising a passivation layer encapsulating side surfaces and an upper surface of the body.

5. The thin film capacitor of claim 1, wherein the body has a multilayer structure including a plurality of internal electrodes having the dielectric layers disposed therebetween, each internal electrode including a first internal electrode layer and second internal electrode layers disposed in contact with upper and lower surfaces of the first internal electrode layer, and the second internal electrode layers each being in contact with a dielectric layer.

6. The thin film capacitor of claim 5, wherein the first external electrode is electrically connected to the first internal electrode layer of one internal electrode by a first via, and the second external electrode is electrically connected to the second internal electrode layer of another internal electrode by a second via.

7. The thin film capacitor of claim 6, wherein, in an entire region of an upper surface of the first internal electrode layer of the one internal electrode, a region of the upper surface of the first internal electrode layer, excluding a region in contact with the second internal electrode layer, is in contact with the first via and an insulation resin covering the first via.

8. The thin film capacitor of claim 6, wherein the first via penetrates through each of the dielectric layers, the first internal electrode layer and the second internal electrode layer of the another internal electrode, and is in contact with a lowermost first internal electrode layer among first internal electrode layers.

9. The thin film capacitor of claim 6, wherein the first via extends deeper than the second via.

10. The thin film capacitor of claim 1, wherein two or more dielectric layers are provided, and at least three internal electrode layers are disposed between each respective dielectric layer and another dielectric layer closest to the respective dielectric layer.

11. The thin film capacitor of claim 10, wherein, among the internal electrode layers disposed between the dielectric layers, the number of the first internal electrode layers is smaller than the number of second internal electrode layers.

12. The thin film capacitor of claim 1, wherein the first external electrode includes a first connection electrode and a first electrode pad disposed on the first connection electrode.

13. The thin film capacitor of claim 1, wherein the second external electrode includes a second connection electrode and a second electrode pad disposed on the second connection electrode.

14. The thin film capacitor of claim 1, wherein a conductivity of a material included in the first internal electrode layer is greater than a conductivity of a material included in the second internal electrode layer.

15. The thin film capacitor of claim 1, wherein a material included in the first internal electrode layer includes gold (Au).

16. The thin film capacitor of claim 1, wherein the first internal electrode layer has a composition different from the second internal electrode layers, and a material included in each second internal electrode layer includes one or more of platinum (Pt) and iridium (Ir).

17. The thin film capacitor of claim 1, wherein the body includes pluralities of dielectric layers, first internal electrode layers, and second internal electrode layers that are alternately stacked, and
both a first internal electrode layer and a second internal electrode layer are disposed between two adjacent dielectric layers in the stack of the body.

18. The thin film capacitor of claim 1, wherein the body includes pluralities of dielectric layers and first internal electrode layers that are alternately stacked, and
a second internal electrode layer is disposed between each adjacent pair of a dielectric layer and a first internal electrode layer in the stack of the body.

19. The thin film capacitor of claim 1, wherein each dielectric layer in the body is spaced apart from any first internal electrode layer including the material having the lower melting point by a second internal electrode layer.

20. A thin film capacitor comprising:
a body including a dielectric layer, a first internal electrode layer, and a second internal electrode layer including iridium (Ir), a melting point of a material included in the first internal electrode layer being lower than a melting point of the iridium (Ir) included in the second internal electrode layer; and
a first external electrode and a second external electrode disposed on an upper surface of the body,
wherein the second internal electrode layer including iridium (Ir) is disposed directly on an upper surface of the first internal electrode layer that includes the material having the lower melting point, and directly on a lower surface of the first internal electrode layer opposing the upper surface of the first internal electrode layer that includes the material having the lower melting point.

21. A thin film capacitor, comprising:
a body including a dielectric layer, a first internal electrode layer, and second internal electrode layers each disposed in contact with a respective one of opposing upper and lower surfaces of the first internal electrode layer, a melting point of a material included in the first internal electrode layer being lower than a melting point of a material included in the second internal electrode layers;
a first external electrode and a second external electrode disposed on an upper surface of the body; and
a passivation layer encapsulating side surfaces of the body,
wherein the first internal electrode layer and the second internal electrode layers are each exposed to the side surfaces of the body, and end surfaces of the first internal electrode layer and the second internal electrode layers contact the passivation layer.

22. A thin film capacitor, comprising:
a body including a plurality of internal electrodes having dielectric layers disposed therebetween, each internal electrode including a first internal electrode layer and second internal electrode layers each disposed in contact with a respective one of opposing upper and lower surfaces of the first internal electrode layer, the second internal electrode layers each being in contact with a dielectric layer, and a melting point of a material included in the first internal electrode layer being lower than a melting point of a material included in the second internal electrode layers; and
a first external electrode and a second external electrode disposed on an upper surface of the body,
wherein the first external electrode is electrically connected to the first internal electrode layer of one internal electrode by a first via, and the second external electrode is electrically connected to the second internal electrode layer of another internal electrode by a second via,
the first via penetrates through each of the dielectric layers, the first internal electrode layer, and the second internal electrode layers of the another internal electrode, and the first via penetrates through a central portion of the first internal electrode layer and the second internal electrode layers spaced apart from peripheral edges of the first internal electrode layer and the second internal electrode layers.

* * * * *